(12) United States Patent
Maslow et al.

(10) Patent No.: US 9,133,378 B2
(45) Date of Patent: Sep. 15, 2015

(54) DEICING COMPOSITION

(71) Applicant: AKZO NOBEL CHEMICALS INTERNATIONAL B.V., Amersfoort (NL)

(72) Inventors: Wasil Maslow, Deventer (NL); Edwin Ronald De Jong, Deventer (NL); René Lodewijk Maria Demmer, Enter (NL)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 0 days.

(21) Appl. No.: 14/355,987

(22) PCT Filed: Nov. 2, 2012

(86) PCT No.: PCT/EP2012/071678
§ 371 (c)(1),
(2) Date: May 2, 2014

(87) PCT Pub. No.: WO2013/068299
PCT Pub. Date: May 16, 2013

(65) Prior Publication Data
US 2014/0284518 A1    Sep. 25, 2014

(30) Foreign Application Priority Data
Nov. 9, 2011    (EP) .................................... 11188481

(51) Int. Cl.
*C09K 3/18*    (2006.01)

(52) U.S. Cl.
CPC ...................................... *C09K 3/185* (2013.01)

(58) Field of Classification Search
CPC ................................. C09K 3/18; C09K 3/185
USPC ............................................. 106/13; 252/70
See application file for complete search history.

(56) References Cited

U.S. PATENT DOCUMENTS

| | | | |
|---|---|---|---|
| 4,824,588 A | 4/1989 | Lin | |
| 5,135,674 A | 8/1992 | Kuhajek et al. | |
| 5,635,101 A | 6/1997 | Janke et al. | |
| 5,674,428 A | 10/1997 | Lott et al. | |
| 5,709,812 A | 1/1998 | Janke et al. | |
| 5,709,813 A | 1/1998 | Janke et al. | |
| 5,922,240 A | 7/1999 | Johnson et al. | |
| 5,942,150 A | 8/1999 | Heuer et al. | |
| 5,965,058 A | 10/1999 | Janke et al. | |
| 6,080,330 A | 6/2000 | Bloomer | |
| 6,149,834 A * | 11/2000 | Gall et al. | 252/70 |
| 6,299,793 B1 | 10/2001 | Hartley et al. | |
| 6,440,325 B1 | 8/2002 | Hartley et al. | |
| 6,506,318 B1 | 1/2003 | Sapienza et al. | |
| 6,582,622 B1 | 6/2003 | Hartley et al. | |
| 6,593,468 B1 | 7/2003 | Lange et al. | |
| 6,596,188 B1 | 7/2003 | Hartley et al. | |
| 6,641,753 B1 | 11/2003 | Bloomer | |
| 6,770,217 B2 | 8/2004 | Hartley et al. | |
| 6,861,009 B1 | 3/2005 | Leist | |
| 7,758,769 B2 | 7/2010 | Sheen et al. | |
| 7,854,856 B2 * | 12/2010 | Sapienza et al. | 252/70 |
| 2003/0205693 A1 | 11/2003 | Hartley et al. | |
| 2003/0209690 A1 | 11/2003 | Hartley et al. | |
| 2003/0213933 A1 | 11/2003 | Hartley et al. | |
| 2005/0017214 A1 | 1/2005 | Hartley et al. | |
| 2005/0031770 A1 | 2/2005 | Knauf | |
| 2006/0175574 A1 | 8/2006 | Bytnar | |
| 2006/0202156 A1 | 9/2006 | Sapienza et al. | |
| 2007/0278446 A1 | 12/2007 | Koefod | |
| 2008/0128651 A1 | 6/2008 | Ossian et al. | |
| 2009/0026411 A1 | 1/2009 | Sheen et al. | |
| 2009/0314983 A1 | 12/2009 | Sapienza et al. | |
| 2010/0327215 A1 | 12/2010 | Boluk | |
| 2011/0000081 A1 | 1/2011 | Lee et al. | |
| 2011/0024673 A1 | 2/2011 | Sapienza et al. | |
| 2014/0091252 A1 | 4/2014 | De Jong et al. | |
| 2014/0110624 A1 | 4/2014 | Demmer et al. | |
| 2014/0284518 A1 | 9/2014 | Maslow et al. | |

FOREIGN PATENT DOCUMENTS

| | | |
|---|---|---|
| CN | 1344774 A | 4/2002 |
| CN | 1678709 A | 10/2005 |
| CN | 1735673 A | 2/2006 |
| CN | 101665338 A | 3/2010 |
| EP | 180568 | 5/1986 |
| EP | 404374 | 12/1990 |
| EP | 1862522 | 12/2007 |
| JP | S62-089785 | 10/1985 |
| JP | S61-108686 | 5/1986 |
| JP | A-S63-097683 | 10/1986 |
| JP | H03-065185 | 3/1991 |
| JP | H09-048961 | 8/1995 |
| JP | A-H11-035927 | 7/1997 |
| JP | 2000-034472 | 7/1998 |
| JP | 2001-187881 | 11/1999 |
| JP | 2000-515900 | 11/2000 |
| JP | 2001-510490 | 7/2001 |
| JP | 2004-510031 | 4/2004 |
| JP | 2004-269631 | 9/2004 |
| JP | 2005-533891 | 11/2005 |
| JP | 2006-501322 | 1/2006 |
| JP | 2006-199803 | 8/2006 |

(Continued)

OTHER PUBLICATIONS

Derwent-Acc-No. 2010-D19617, abstract of Chinese Patent Specification No. CN 101665338 A (Mar. 2010).*

(Continued)

*Primary Examiner* — Anthony J Green
(74) *Attorney, Agent, or Firm* — Kenyon & Kenyon LLP

(57) ABSTRACT

The present invention relates to a deicing composition comprising (i) a deicing agent selected from the group consisting of sodium chloride, calcium magnesium acetate, calcium chloride, magnesium chloride, potassium chloride, potassium acetate, sodium acetate, sodium formate, potassium formate, (ii) a lignin derivative, and (iii) molasses. It furthermore relates to a process for preparing said deicing composition and to a process for deicing a surface using said deicing composition.

22 Claims, 2 Drawing Sheets

(56) References Cited

FOREIGN PATENT DOCUMENTS

| | | |
|---|---|---|
| JP | 2007-525959 | 9/2007 |
| JP | 2007-327054 | 12/2007 |
| JP | 2008-508302 | 3/2008 |
| JP | 2012-531478 | 6/2009 |
| JP | 2013-506753 | 2/2013 |
| WO | 97/07178 | 2/1997 |
| WO | 97/26309 | 7/1997 |
| WO | 97/34960 | 9/1997 |
| WO | 99/20657 | 4/1999 |
| WO | 00/50531 | 8/2000 |
| WO | 2002-026910 | 4/2002 |
| WO | 2004/009727 | 1/2004 |
| WO | 2004-013250 | 2/2004 |
| WO | 2004063154 | 7/2004 |
| WO | 2004-112490 | 12/2004 |
| WO | 2006-015120 | 2/2006 |
| WO | 2011000081 | 1/2011 |
| WO | 2011/044135 | 4/2011 |

OTHER PUBLICATIONS

International Search Report for International Application No. PCT/EP2012/071678, mailed on Feb. 7, 2013.
International Preliminary Report on Patentability for International Application No. PCT/EP2012/071678, mailed on Feb. 11, 2014.
European Search Report for European Application No. EP 11188481.3, completed Mar. 26, 2012.
Crow publication 146a, 2005. Corresponds to new version Crow Handboek visuele inspectie 2011 as provided. Cited and described in the specification, paragraph 0071 (US 2014-0284518).
Sikkema, D. J. et al, Macromolecules, 1989, vol. 22, pp. 364-366.
International Search Report and Written Opinion for International Application No. PCT/EP2012/060542 mailed on Jul. 4, 2012.
International Preliminary Report on Patentability for International Application No. PCT/EP2012/060542 mailed on May 29, 2013.
International Search Report and Written Opinion for International Application No. PCT/EP2012/060543 mailed on Jul. 4, 2012.
International Preliminary Report on Patentability for International Application No. PCT/EP2012/060543 mailed on Jun. 28, 2013.
Office Action from New Zealand Application No. 617459, dated on Sep. 9, 2014.
Abstract of the Journal of Dairy Research, vol. 55, Issue 03, Aug. 1988, pp. 443-448.
Fly Ash, http://en.wikipedia.org/wiki/Fly_ash (last visited Dec. 10, 2014).
Plaster, http://en.wikipedia.org/wiki/Plaster (last visited Dec. 10, 2014).
Slag, http://en.wikipedia.org/wiki/Slag (last visited Dec. 10, 2014).
Lime plaster, http://en.wikipedia.org/wiki/Lime_plaster (last visited Dec. 10, 2014).
Whey, http://en.wikipedia.org/wiki/Whey (last visited Oct. 9, 2014).
Niro Inc., Filtration Division, Concentration of the Raffinate Fraction from Beet Molasses Desugarization Chromatographic Separators, Hudson, Wisconsin.
Japanese Office Action from Japanese Patent Application No. 2014-514028, mailed on Dec. 16, 2014 (English-language Office Action Report and translation of Office Action).
Japanese Office Action from Japanese Patent Application No. 2014-514029, mailed on Dec. 16, 2014 (English-language Office Action Report and translation of Office Action).
Abstract of Chinese Patent Specification No. CN 101665338 A (Mar. 2010).
Eurasian Office Action from Eurasian Patent Application No. 2013-91745, issued on Nov. 21, 2014 (English-language translation of Office Action).
Eurasian Office Action from Eurasian Patent Application No. 2013-91746, issued on Nov. 21, 2014 (English-language translation of Office Action).
Chinese Office Action from Chinese Patent Application No. 2012-0026167.4, issued on Dec. 18, 2014 (English-language translation of Office Action Report).
Chinese Office Action from Chinese Patent Application No. 2012-80055086.7, issued on Mar. 30, 2015. (English-language translation provided.).

* cited by examiner

DEICING COMPOSITION

REFERENCE TO RELATED APPLICATIONS

This application is the U.S. National Phase of PCT/EP2012/071678, filed on Nov. 2, 2012, and claims the benefit of EP Application No. 11188481.3, filed on Nov. 9, 2011.

The present invention relates to a deicing composition and to a process for the preparation of said deicing composition. It furthermore relates to a process for deicing a surface and to a kit of parts for use in said process. Finally, it relates to the use of a combination of a lignin derivative and molasses for improving the efficiency of a deicing composition.

Wintry conditions provide inconveniences for roads and traffic in the form of snow or black ice. Obviously, eliminating snow, frost, and ice on roads and highways has enormous safety benefits. Sodium chloride (NaCl) is commonly used to control snow and ice formation on roadways, highways, and sidewalks. The sodium chloride works as a deicing agent by dissolving into precipitation on roadways and lowering the freezing point, thereby melting ice and snow. Other salts that can be used as deicers include for example calcium chloride and magnesium chloride. These compounds depress the freezing point of water to an even lower temperature than sodium chloride. Also potassium chloride is sometimes used as a deicer. Another, commonly known alternative to road salt is calcium magnesium acetate. Other, less known deicer salts include potassium acetate, sodium acetate, sodium formate, and potassium formate.

The wintry conditions also cause damage to asphalt, bituminous, and concrete surfaces. These surfaces have porous structures. Asphalt in particular comprises a number of subsurface channels. When the air/ground temperature becomes sufficiently low, an aqueous solution which is present in the channels of the asphalt will expand upon freezing, thus creating mechanical stress in the asphalt. Especially after repeated freezing and thawing, the asphalt will break, resulting in potholes. Not only do large sums of money have to be spent each year to repair damaged roadways and highways, potholes can also result in dangerous situations for traffic. Furthermore, the additional maintenance required will result in additional traffic jams.

The problem of damage to roadways and highways because of the expansion and contraction of water or water-based solutions during freezing and thawing cycles has become an even bigger issue since the introduction of a new type of asphalt, the so-called highly porous asphalt, in the nineties. This highly porous asphalt concrete may comprise up to 20% of hollow space. This has the advantage that rain and melt water will flow away quickly from the asphalt surface through the subsurface channels into the soil. The asphalt road surface itself retains practically no moisture, and hence, is not slick and slippery even in case of heavy rainfall. While the use of this type of asphalt has an enormous beneficial effect on safety under rainy conditions, a disadvantage is that under wintry conditions more of the deicing agent is needed in order to keep the roads free of snow and ice during the winter, as the deicing agent will also flow away from the road surface with the melt water.

It is an object of the present invention to provide a deicing composition which has improved deicing properties. More particularly, it is an object of the present invention to provide a deicing composition which remains effective over a longer period of time, so that the deicing agent can be applied less frequently and the damage to especially highly porous road surfaces will be reduced.

Surprisingly, the objective has been met by adding a combination of two types of additives, viz. a lignin derivative and molasses, to a deicing agent. In more detail, the present invention relates to a deicing composition comprising (i) a deicing agent selected from the group consisting of sodium chloride, calcium magnesium acetate, calcium chloride, magnesium chloride, potassium chloride, potassium acetate, sodium acetate, sodium formate, and potassium formate, (ii) a lignin derivative, and (iii) molasses.

It was found that the deicing composition according to the present invention has an improved performance. It was found that by using the specific combination of molasses and a lignin derivative, the deicing agent will remain active over a longer period of time.

In addition, it was found that the use of the deicing composition according to the present invention reduces damage to road surfaces after repeated freezing and thawing.

The deicing composition according to the present invention was found to be less corrosive than conventional deicing compositions.

Due to better adhesion properties of the deicing composition compared to use of the deicing agent alone, less deicing agent is likely to be blown away and the deicing agent will be retained on the road for a longer period of time.

DETAILED DESCRIPTION

Figure 1:
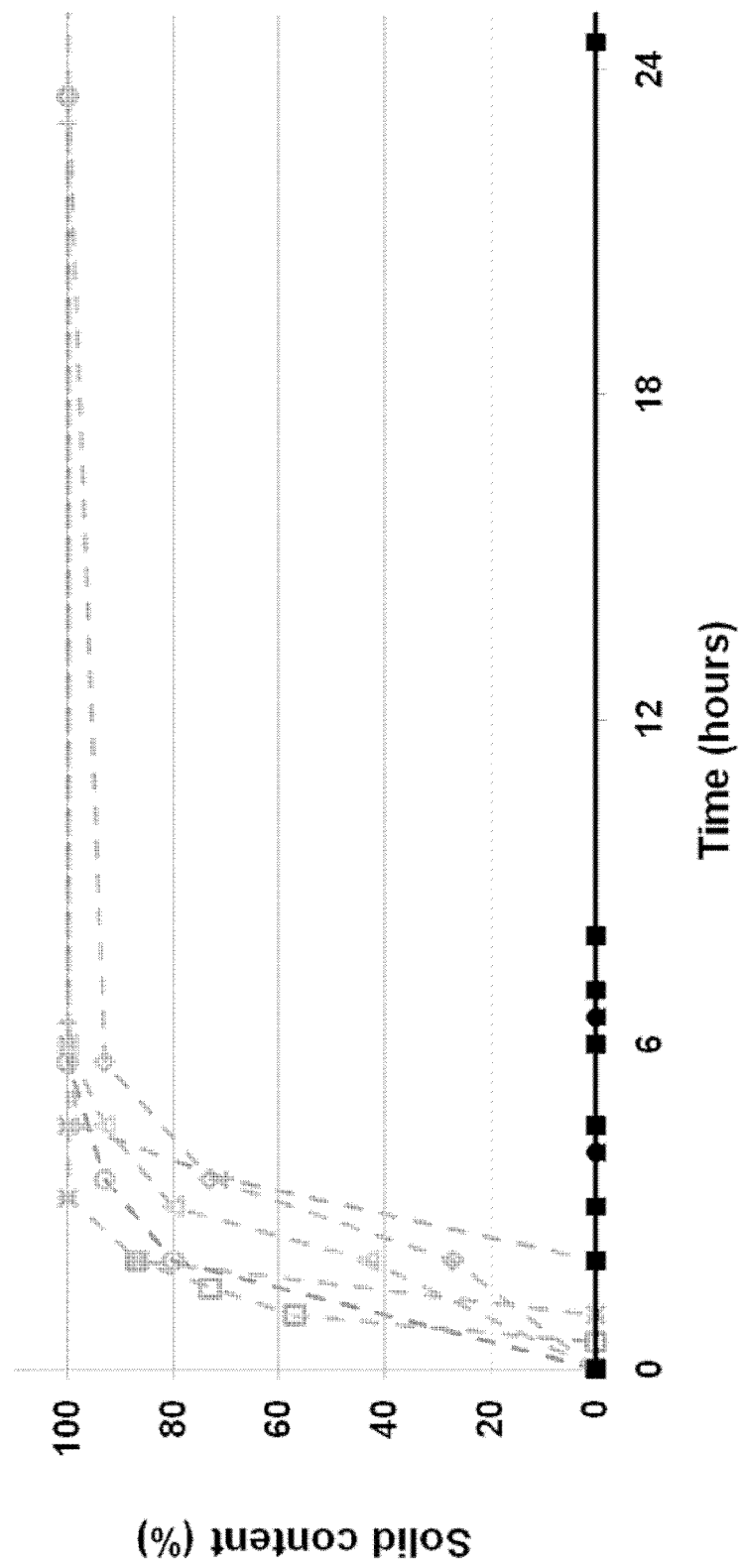
FIG. 1 is a graph of solid content (%) versus time (hours), showing the results of Comparative Examples A, B, C, D, E and H, and Examples 1, 2, 3 and 4.

The deicing agent present in the deicing composition according to the present invention is selected from the group consisting of sodium chloride, calcium magnesium acetate, calcium chloride, magnesium chloride, potassium chloride, potassium acetate, sodium acetate, sodium formate, and potassium formate. Preferably, however, the deicing agent is a chloride salt, i.e. it is preferably selected from the group consisting of sodium chloride, calcium chloride, magnesium chloride, and potassium chloride. More preferably, calcium chloride is used as the deicing agent in the compositions according to the present invention. Most preferably, sodium chloride is used as the deicing agent in the compositions according to the present invention, as it is cheap and available in large quantities.

The deicing composition according to the present invention can be in aqueous form, solid form or in the form of a slurry.

If the deicing composition is an aqueous composition, the deicing agent is preferably present in an amount of at least 5% by weight, more preferably at least 10% by weight, and most preferably at least 20% by weight (based on the total weight of the deicing composition). Preferably, such aqueous deicing composition comprises at most the saturation concentration of the deicing agent.

The deicing composition according to the present invention can also be in the form of a slurry, containing deicing agent at concentrations higher than the saturation concentration.

If the deicing composition is in the form of a solid, it may comprise as little as 5% by weight of deicing agent (based on the total weight of the deicing composition) if it is, for example, mixed with gritting material like sand. Preferably, however, the solid deicing composition according to the present invention comprises at least 50% by weight of the deicing agent, yet more preferably at least 70% by weight, and most preferably at least 96% by weight of the deicing agent (based on the total weight of the deicing composition).

The biopolymer lignin present in the deicing composition is an amorphous polymer related to cellulose that provides rigidity and together with cellulose forms the woody cell walls of plants and the cementing material between them. It generally has an average molecular weight of at least 10,000 Da. Lignin is most commonly found in wood, but can also be found in plants and algae. It consists of the monolignols paracoumaryl alcohol, coniferyl alcohol, and sinapyl alcohol. These monomers are incorporated in varying amounts.

Lignin can be rendered water-soluble by exposing it to acidic or alkaline conditions or bleaching it (treatment with e.g. $H_2O_2$ or hypochlorite), thus increasing the number of aliphatic and aromatic hydroxyl and carboxylic acid functionalities or hydrolyzing it to lower molecular fragments. Under neutral conditions, lignin can be hydrophilized by sulphite pulping while introducing sulphonate or sulphonic acid functionality.

The term "lignin derivative" as used throughout the specification is meant to denote all compounds (including salts) derived from lignin using at least one of the just-described procedures and which have a solubility of at least 10 g per liter in water at 25° C. Other chemical functionalities may be present as long as they do not compromise the overall water-solubility. Preferably, the lignin derivative according to the present invention has a molecular weight of at least 5 kDa, more preferably at least 10 kDa. More preferably, the lignin derivative carries carboxylic acid functionality, while most preferably, it carries sulphonate or sulphonic acid groups (i.e. it is a lignosulphonate).

A lignosulphonate, according to the present invention, is a sulphonated lignin derived from the biopolymer lignin. During the pulping process of wood in the presence of sulphite, the lignosulphonate is produced as a by-product. The product can be (chemically) purified and spray-dried, though neither of these steps is required for a good efficacy in accordance with the present invention. Lignosulphonates have very broad ranges of molecular mass (they are very polydisperse). For example, a range of from 1,000-140,000 Da has been reported for softwood. Lignosulphonates with lower values have been reported for hardwoods.

The lignin derivative suitable for use in the composition according to the present invention is preferably a lignin derivative derived from wood, plants or algae. It is also possible to use a mixture of lignin derivatives originating from different sources. Most preferable is the use of a lignin derivative derived from wood. All types of lignin derivatives can be used in the composition according to the present invention, i.e. including the Na, K, Ca, Mg, or $NH_4$ salts.

The lignin derivative is typically present in the deicing composition according to the present invention in an amount of at least 10 ppm, more preferably at least 100 ppm, and most preferably at least 500 ppm. It is preferably present in an amount of less than 10,000 ppm, more preferably in an amount of less than 8,000 ppm, and most preferably in an amount of less than 5,000 ppm.

The lignin derivative concentrations are expressed in ppm, herewith defined as mg lignin derivative per kg of the total deicing composition.

The molasses to be present in the deicing composition according to the present invention can be any molasses conventionally used for deicing purposes. It is noted that it is possible to use molasses which have been subjected to one or more purification steps, such as the removal of sulphites, sulphur dioxide, ash, microbial life forms or other insolubles, as removal of these contaminants does not have an adverse effect on performance in the deicing composition. It is furthermore noted that it is possible to use chemically, biologically, physically or otherwise treated molasses, such as, but not exclusively, desugared beet molasses, acid/base treated molasses, carboxylated molasses (wherein sugars present in molasses have been carboxylated with conventional techniques), and molasses containing one or more additives. Preferably, the molasses is selected from the group consisting of molasses derived from corn (syrup), molasses derived from sugar beet, molasses derived from sugar cane, and molasses derived from grapes.

The term "molasses" includes all the above types of treated or untreated molasses.

Preferably, the molasses is beet or cane sugar molasses containing between 20% and 80% by weight of sugars, yet more preferably containing between 40% and 60% by weight of sugars, most preferably between 45% and 55% by weight of sugars.

The molasses is typically present in the deicing composition according to the present invention in an amount of at least 10 ppm, more preferably at least 100 ppm, and most preferably at least 500 ppm. It is preferably present in an amount of less than 50,000 ppm, more preferably in an amount of less than 10,000 ppm, and most preferably in an amount of less than 5,000 ppm.

The molasses concentrations are expressed in ppm, herewith defined as mg molasses per kg of the total deicing composition.

The present invention furthermore relates to a process for preparing the deicing composition according to the present invention. Said process consists of spraying an aqueous treatment solution comprising a lignin derivative and molasses onto a deicing agent selected from the group consisting of sodium chloride, calcium magnesium acetate, calcium chloride, magnesium chloride, potassium chloride, potassium acetate, sodium acetate, sodium formate, and potassium formate. Preferably, the aqueous treatment solution is sprayed onto the deicing agent in an amount so that the resulting deicing composition will comprise at least 10 ppm, more preferably at least 100 ppm, and most preferably at least 500 ppm of the lignin derivative and at least 10 ppm, more preferably at least 100 ppm, and most preferably at least 500 ppm of the molasses. Preferably, the resulting deicing composition comprises no more than 10,000 ppm, more preferably no more than 8,000 ppm, and most preferably no more than 5,000 ppm of the lignin derivative. Preferably, the resulting deicing composition comprises no more than 50,000 ppm, more preferably no more than 10,000 ppm, and most preferably no more than 5,000 ppm of the molasses.

As described above, the lignin derivative is preferably derived from plants or algae. It can also be a mixture of lignin derivatives originating from different sources. The molasses is preferably selected from the group consisting of molasses derived from corn (syrup), molasses derived from sugar beet, and molasses derived from grapes.

The present invention furthermore relates to a process for deicing a surface. Said surface can be deiced in various ways.

In one embodiment the deicing composition according to the present invention is spread onto said surface.

In another embodiment, the process for deicing a surface comprises the steps of mixing a solid deicing agent selected from the group consisting of sodium chloride, calcium magnesium acetate, calcium chloride, magnesium chloride, potassium chloride, potassium acetate, sodium acetate, sodium formate, and potassium formate with an aqueous treatment solution comprising a lignin derivative and molasses, and spreading the thus obtained mixture onto said surface. This method is a preferred embodiment, since the risk of the deicing composition being blown away is greatly reduced. Furthermore, a better adhesion of the deicing composition to the road surface is attained.

In yet another embodiment, the process for deicing a surface comprises the steps of preparing an aqueous solution comprising between 5% by weight and the saturation concentration of a solid deicing agent selected from the group consisting of sodium chloride, calcium magnesium acetate, calcium chloride, magnesium chloride, potassium chloride, potassium acetate, sodium acetate, sodium formate, and potassium formate, a lignin derivative, and molasses and applying said mixture onto said surface, e.g. by spraying. This method is also a preferred embodiment, since the risk of the deicing composition being blown away is also greatly reduced in this method. Furthermore, a better adhesion of the deicing composition to the road surface is attained.

In yet another embodiment of the present invention, the process for deicing a surface comprises the steps of spreading a deicing agent selected from the group consisting of sodium chloride, calcium magnesium acetate, calcium chloride, magnesium chloride, potassium chloride, potassium acetate, sodium acetate, sodium formate, and potassium formate in solid or aqueous form onto said surface and separately spreading a lignin derivative and molasses in solid or aqueous form onto said surface.

The surface to be deiced is preferably a surface selected from the group consisting of non-porous asphalt road, asphalt road, porous asphalt road, concrete road, bituminous road, brick road, graveled path, cobbled road, unpaved road, and pavement.

Preferably, at least 1 g of deicing agent, at least 0.01 mg of a lignin derivative, and at least 0.01 mg of molasses is introduced per $m^2$ of said surface. Preferably, no more than 50 g of deicing agent is introduced per $m^2$ of surface to be deiced. Preferably, no more than 500 mg of a lignin derivative and no more than 2500 mg of molasses are introduced per $m^2$ of surface to be deiced.

In yet another aspect of the present invention, it relates to a kit of parts for use in the process for deicing a surface. The kit of parts comprises an anti-icing composition comprising a deicing agent selected from the group consisting of sodium chloride, calcium magnesium acetate, calcium chloride, magnesium chloride, potassium chloride, potassium acetate, sodium acetate, sodium formate, and potassium formate as a component (a) and an aqueous solution comprising between 0% and its saturation concentration of the deicing agent, between 10 ppm and its saturation concentration of lignin derivative, and between 10 ppm and its saturation concentration of molasses as a component (b). Preferably, component (a) forms between 60 and 99.99% by weight of the kit of parts and component (b) forms between 0.01% and 40% by weight of the kit of parts (with component (a) and (b) adding up to 100%). Component (a) can be in the form of an aqueous solution, a slurry, or a solid (vide supra).

Component (b) can also be a solid mixture of lignin derivative and molasses. Accordingly, the present invention also relates to a kit of parts for use in the process for deicing a surface according to the present invention comprising an anti-icing composition comprising a deicing agent selected from the group consisting of sodium chloride, calcium magnesium acetate, calcium chloride, magnesium chloride, potassium chloride, potassium acetate, sodium acetate, sodium formate, and potassium formate as a component (a) and a solid component comprising a lignin derivative and molasses as a component (b). Preferably, component (a) forms between 90 and 99.9% by weight of the kit of parts and component (b) forms between 0.1% and 10% by weight of the kit of parts (with component (a) and (b) adding up to 100%). Component (a) can be in the form of an aqueous solution, a slurry, or a solid (vide supra). Preferably, it is in the form of a solid.

Finally, the present invention relates to the use of a combination of a lignin derivative and molasses for improving the efficiency of a deicing composition comprising a deicing agent selected from the group consisting of sodium chloride, calcium magnesium acetate, calcium chloride, magnesium chloride, potassium chloride, potassium acetate, sodium acetate, sodium formate, and potassium formate, in the deicing of a surface. As said, said surface is preferably selected from the group consisting of non-porous asphalt road, asphalt road, porous asphalt road, concrete road, bituminous road, brick road, graveled path, cobbled road, unpaved road, and pavement.

The present invention is further illustrated by the following non-limiting Examples and Comparative Examples.

EXAMPLES

Example 1

Freezing Tests

Materials:

| Abbreviation | Material | Origin |
| --- | --- | --- |
| $H_2O$ | Water | Tap water |
| NaCl | NaCl, Sanal P grade | AkzoNobel, Mariager, Denmark |
| RM | Raw Molasses | Suiker Unie, Netherlands |
| LI | Lignosulphonate Na 244, spray dried | Borregaard, Karlsruhe Germany |

Machines

| Machine | Origin | Settings |
| --- | --- | --- |
| Refrigerator | | −29 deg Celsius |

Sample Preparation

In all preparations below, 22% by weight of NaCl brine is referred to as "brine". Possible impurities in the products are not accounted for in the calculation of the final compound concentration; this concentration is defined as the ratio of weighed amount of compound and total mass of the sample.

Compound concentrations are expressed in ppm, herewith defined as mg compound/kg total sample mass.

Stock Solutions

All preparations were carried out batchwise. The mentioned amounts represent the typical batch size at which all samples were prepared.

Brine was prepared by the dissolution of 220 g NaCl into 780 g water.

The lignosulphonate solutions were prepared by the slow addition of sodium lignosulphonate powder to vigorously stirred brine. The brine was stirred by means of a magnetic stirrer. Lignosulphonate stock solutions contained either 30,000 or 3,000 or 300 ppm lignosulphonate.

The RM solutions were prepared by careful addition to vigorously stirred brine. The brine was stirred by means of a magnetic stirrer. The stock solutions contained either 3,000 ppm or 30,000 ppm of RM.

Final Solutions

The final sample solutions were obtained by mixing lignosulphonate and/or molasses stock solutions and the addition of brine. Three examples:
Brine containing 1,000 ppm LI and 1,000 ppm RM: mixing
  10 grams of 3,000 ppm LI stock solution
  10 grams of 3,000 ppm RM stock solution
  10 grams of brine
Brine containing 1,000 ppm LI and 10 ppm RM: mixing
  10 grams of 3,000 ppm LI stock solution
  0.1 grams of 3,000 ppm RM stock solution
  19.9 grams of brine
Brine containing 10,000 ppm LI and 1,000 ppm RM: mixing
  10 grams of 30,000 ppm LI stock solution
  10 grams of 3,000 ppm RM stock solution
  10 grams of brine All samples were prepared following the above-exemplified principle. All samples had the exact total weight of 30 grams, contained in a Greiner tube (PP, 50 mL, Greiner BioOne).

Experimental Conditions

These Greiner tubes were stored in the fridge for a maximum of 2 days until the start of the experiment. Upon starting the experiment, the tubes were stored in the freezer at −29° C. and evaluated by eye for their solids content, with an accuracy of 5-10% per sample. The evaluation of solids content was done by eye, implying the estimation of solids content with respect to the total volume of the sample. All samples were prepared in three-fold and the presented solid contents are calculated as the average of all three samples.

Results

Table 1 is a matrix representation of all combinations of lignosulphonate and molasses tested at different concentrations. Lignosulphonate is arranged horizontally, with the leftmost column showing the samples without lignosulphonate. The raw molasses is arranged vertically, with the uppermost row showing the samples without molasses. In the grey bars, the concentrations of the corresponding additives are given in ppm (mg/kg). All numbers in the white area represent the solids content after 24 hours.

The reference samples containing either lignosulphonate or molasses always show high solids content, although not always 100% solids. However, after longer time all these reference samples without exception completely solidified. All other samples comprising both lignosulphonate and molasses do not solidify completely, if at all. In all cases the solid content is much lower than that of their respective references. From this table it can be derived that there is synergy between lignosulphonate and molasses.

TABLE 1

| | | Lignosulphonate | | | |
| --- | --- | --- | --- | --- | --- |
| Molasses | ppm | 0 | LI 10 | LI 100 | LI 1000 | LI 10000 |
| 0 | | 100 | 100 | 100 | 100 | 100 |
| RM | 10 | 100 | — | — | 0 | — |
| RM | 100 | 87 | — | — | 0 | — |
| RM | 1000 | 100 | 0 | 0 | 0 | 0 |
| RM | 10000 | 100 | — | — | 0 | — |

In Table 2, detailed results of the experiments summarized in Table 1 are shown. For each entry it is mentioned which additives were present and the volume % of solids present in the sample after a certain time (in hours).

TABLE 2

| Ex. | Composition | Axis Labels | Data | | | | | | |
| --- | --- | --- | --- | --- | --- | --- | --- | --- | --- |
| A | no additives | Time (h) | 0 | 1 | 2 | 3 | 5 | 6 | 120 |
| | | Solids (%) | 0 | 0 | 87 | 100 | 100 | 100 | 100 |
| B | 10 ppm LI | Time (h) | 0 | 2 | 4 | 6 | 24 | | |
| | | Solids (%) | 0 | 80 | 93 | 100 | 100 | | |
| C | 100 ppm LI | Time (h) | 0 | 2 | 3 | 5 | 6 | 7 | 8 | 25 |
| | | Solids (%) | 0 | 43 | 80 | 93 | 100 | 100 | 100 | 100 |
| D | 1,000 ppm LI | Time (h) | 0 | 2 | 3 | 5 | 7 | 8 | 25 |
| | | Solids (%) | 0 | 0 | 57 | 73 | 87 | 87 | 98 |
| E | 10,000 ppm LI | Time (h) | 0 | 2 | 4 | 6 | 24 | | |
| | | Solids (%) | 0 | 27 | 73 | 93 | 100 | | |
| F | 10 ppm RM | Time (h) | 0 | 1 | 2 | 4 | 21 | 23 | 25 |
| | | Solids (%) | 0 | 0 | 2 | 7 | 95 | 100 | 100 |
| G | 100 ppm RM | Time (h) | 0 | 1 | 2 | 4 | 21 | 23 | 25 |
| | | Solids (%) | 0 | 0 | 0 | 10 | 100 | 100 | 100 |
| H | 1,000 ppm RM | Time (h) | 0 | 1 | 2 | 4 | 5 | 6 | 23 |
| | | Solids (%) | 0 | 0 | 0 | 70 | 98 | 100 | 100 |
| I | 10,000 ppm RM | Time (h) | 0 | 1 | 2 | 4 | 21 | 23 | 25 |
| | | Solids (%) | 0 | 0 | 0 | 10 | 83 | 93 | 93 |
| 1 | 10 ppm LI + 1,000 ppm RM | Time (h) | 0 | 3 | 4 | 7 | 75 | | |
| | | Solids (%) | 0 | 0 | 0 | 0 | 0 | | |
| 2 | 100 ppm LI + 1,000 ppm RM | Time (h) | 0 | 3 | 4 | 7 | 75 | | |
| | | Solids (%) | 0 | 0 | 0 | 0 | 0 | | |
| 3 | 1000 ppm LI + 1,000 ppm RM | Time (h) | 0 | 2 | 3 | 5 | 6 | 7 | 8 | 25 |
| | | Solids (%) | 0 | 0 | 0 | 0 | 0 | 0 | 0 | 0 |
| 4 | 10,000 ppm LI + 1,000 ppm RM | Time (h) | 0 | 3 | 4 | 7 | 75 | | |
| | | Solids (%) | 0 | 0 | 0 | 0 | 0 | | |
| 5 | 1,000 ppm LI + 10 ppm RM | Time (h) | 0 | 3 | 4 | 7 | 75 | | |
| | | Solids (%) | 0 | 0 | 0 | 0 | 0 | | |
| 6 | 1,000 ppm LI + 100 ppm RM | Time (h) | 0 | 3 | 4 | 7 | 75 | | |
| | | Solids (%) | 0 | 0 | 0 | 23 | 27 | | |
| 7 | 1,000 ppm LI + 10,000 ppm RM | Time (h) | 0 | 3 | 4 | 7 | 75 | | |
| | | Solids (%) | 0 | 0 | 0 | 0 | 33 | | |

Figure 2:
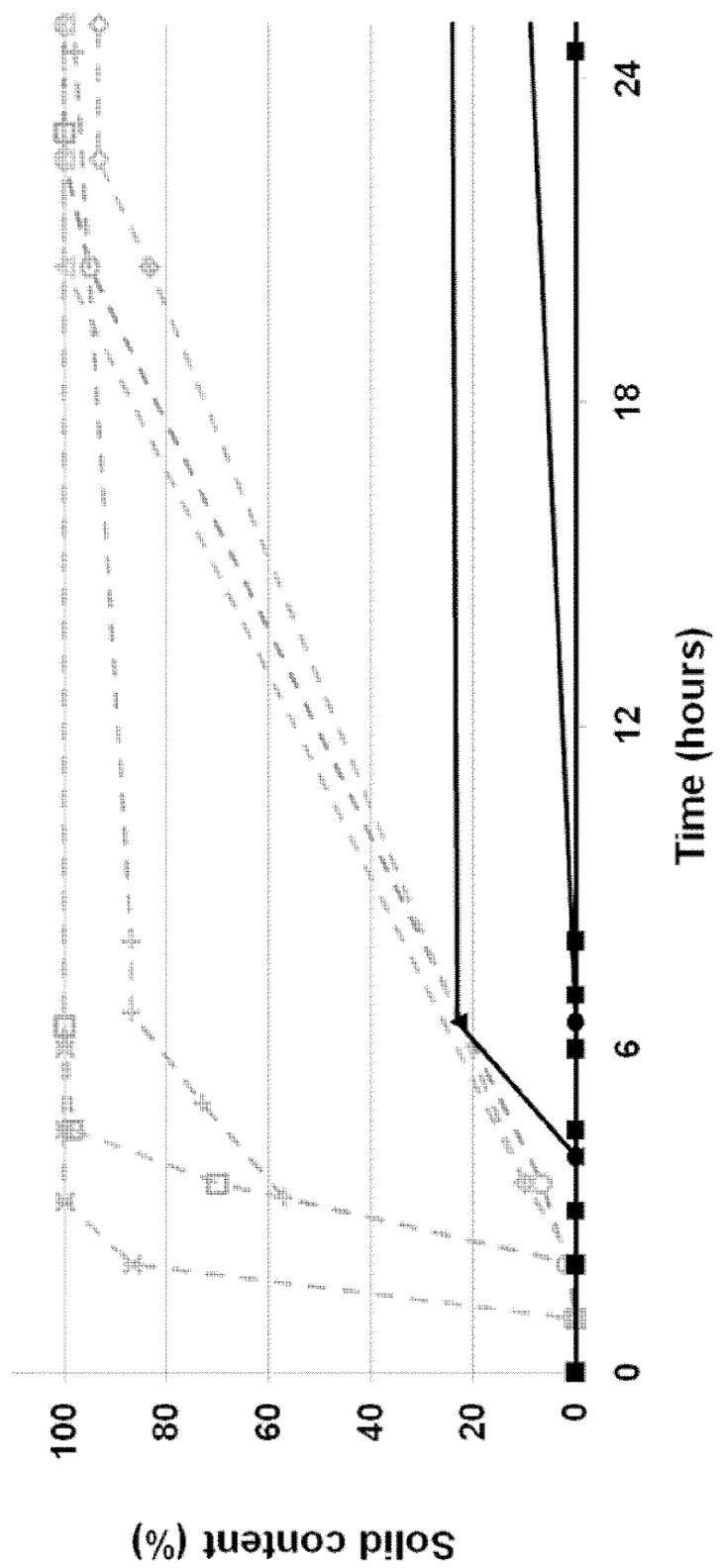
FIG. 2 is a graph of solid content (%) versus time (hours), showing the results of Comparative Examples A, F, G, H, I and D, and Examples 4, 5, 6 and 7.

FIGS. 1-2 have been added for further illustration. The results of Comparative Examples A, B, C, D, E, H and Examples 1, 2, 3, and 4 (see Table 2) can be found in FIG. 1, with
A -*- representing no additives
I -○- representing 10 ppm LI
J -Δ- representing 100 ppm LI
K -□- representing 1,000 ppm LI
L -♦- representing 10,000 ppm LI
D -+- representing 1,000 ppm RM
1 -●- representing 10 ppm LI+1,000 ppm RM
2 -▲- representing 100 ppm LI+1,000 ppm RM
3 -■- representing 1,000 ppm LI+1,000 ppm RM
4 -♦- representing 10,000 ppm LI+1,000 ppm RM The results of Comparative Examples A, F, G, H, I, D and Examples 4, 5, 6, and 7 can be found in FIG. 2 with
A -*- representing no additives
B -○- representing 10 ppm RM
C -Δ- representing 100 ppm RM
D -□- representing 1,000 ppm RM
E -♦- representing 10,000 ppm RM
K -+- representing 1,000 ppm LI
5 -●- representing 10 ppm RM+1,000 ppm LI
6 -▲- representing 100 ppm RM+1,000 ppm LI
3 -■- representing 1,000 ppm RM+1,000 ppm LI
7 -♦- representing 10,000 ppm RM+1,000 ppm LI Both Figures show the synergy between lignosulphonate and molasses. All grey dashed lines (samples containing only one component) go up quickly to 100% solid content, whereas all black solid lines (samples containing a mixture of lignosulphonate and molasses) stay well below all grey dashed lines.

The fact that the compositions according to the present invention do not become solid at a temperature as low as −29° C. has the advantage that damage to road surfaces due to wintry conditions is reduced. After all, as explained in the description, said damage is caused by repeated freezing and thawing of aqueous compositions inside the road's porous structure, as the mechanical stress thus created results in potholes.

Example 2

Measurement of Frost Damage to Asphalt

A highway was selected with two lanes in each direction. Both directions had very comparable asphalt quality and traffic density and identical weather conditions. Both directions were physically separated and de-iced by the above-mentioned method. In this way, the reference and deicing compositions were independently applied and analyzed. On both sides the development of damage was quantified: cracks were measured in meters and raveling was expressed as an areal percentage. This analysis was done for each 100 m section. The development of raveling and cracks during the winter is reported in Tables 3 and 4.

| Item | Details |
| --- | --- |
| Composition | Spreading: 50% by weight solid NaCl + 50% by weight brine (22% by weight NaCl + 0.3% by weight LI + 0.3% by weight RM). The additive content is expressed in dry mass. |
| Reference | Spreading: 50% by weight solid NaCl + 50% by weight brine (22% by weight NaCl) |
| Duration | One winter season (December-March) |
| Location | Denmark, highway, two lanes in both directions. |
| Asphalt | Dense asphalt concrete, ten years old with some existing raveling and cracks. |
| Deicing | 86 deicing actions were carried out throughout the winter |
| Weather | Temperatures mostly between −5 and +5° C., some wintry precipitation. |
| Sections | 51 reference sections and 49 sections where the preferred deicing composition was applied. Each measuring 100 m in length. |
| Analysis | Raveling and cracks analyzed according to the Dutch CROW standard by means of detailed visual inspections: CROW publication 146a, 2005). |
| Ravelling | Raveling is quantified in areal fractions and in the categories (zero (0), light (L), medium (M), and severe (S)). These categories are part of the above-mentioned CROW standard. |

TABLE 3

| | Development of raveling | | | |
| --- | --- | --- | --- | --- |
| | 0-L | L-M | 0-M | total |
| Reference | 0.12% (2) | 1.39% (13) | 0.04% (1) | 1.55% |
| Deicing composition | 0.34% (1) | 0.00% (48) | 0.00% (48) | 0.34% |

Table 3 gives the fraction of road surface area that underwent deterioration in terms of raveling. The occurring changes were unraveled turning into lightly raveled (indicated as 0-L, column 1), lightly raveled turning into medium raveled (indicated as L-M, column 2), and unraveled turning into medium raveled (indicated as 0-M, column 3). The number of occurrences (number of 100 m-sections) is given in parentheses. In total, 15 reference sections of 100 m suffered from increased raveling, whereas only 1 100 m section treated with the deicing composition showed increased raveling. The totals mentioned in Table 3 show that the deicing composition reduces the development of raveling approximately by a factor of 4.

TABLE 4

| | Development of cracks | | | |
| --- | --- | --- | --- | --- |
| | Before winter | After winter | Gain | % |
| Reference | 62.2 (10) | 97.2 (11) | 35 (5) | 56% |
| Deicing composition | 126 (20) | 147 (20) | 21 (2) | 17% |

Table 4 gives the total crack length in meters. In parentheses the number of sections with cracks is given. Despite the larger number of initial cracks and the higher total crack length, the cracks developed approximately 3 times less if the deicing composition was used.

The above results show that the deicing composition according to the invention effectively reduces frost damage (raveling and cracks) compared to the reference deicing method.

The invention claimed is:
1. A deicing composition comprising:
(i) a deicing agent selected from the group consisting of sodium chloride, calcium magnesium acetate, calcium chloride, magnesium chloride, potassium chloride, potassium acetate, sodium acetate, sodium formate, and potassium formate;

(ii) between 10 ppm and 10,000 ppm of a lignin derivative; and
(iii) between 10 ppm and 50,000 ppm of molasses;
wherein the deicing composition is water-soluble.

2. The deicing composition according to claim 1, wherein the molasses is selected from the group consisting of molasses derived from corn (syrup), molasses derived from sugar beet, molasses derived from sugar cane, and molasses derived from grapes.

3. The deicing composition according to claim 1, wherein the deicing composition is:
an aqueous deicing composition comprising at least 5% by weight, based on the total weight of the deicing composition, of deicing agent;
a solid deicing composition comprising at least 50% by weight, based on the total weight of the deicing composition, of deicing agent; or
a deicing composition in slurry form, comprising deicing agent in an amount higher than its saturation concentration.

4. The deicing composition according to claim 3, wherein the molasses is selected from the group consisting of molasses derived from corn (syrup), molasses derived from sugar beet, molasses derived from sugar cane, and molasses derived from grapes.

5. The deicing composition according to claim 1, wherein the deicing agent is sodium chloride.

6. The deicing composition according to claim 1, wherein the lignin derivative is lignosulphonate.

7. The deicing composition according to claim 2, wherein the deicing agent is sodium chloride.

8. The deicing composition according to claim 2, wherein the lignin derivative is lignosulphonate.

9. The deicing composition according to claim 7, wherein the lignin derivative is lignosulphonate.

10. A process for preparing the deicing composition according to claim 1, the process comprising:
spraying an aqueous treatment solution comprising the lignin derivative and the molasses onto the deicing agent.

11. The process according to claim 10, wherein the deicing agent is sodium.

12. The process according to claim 10, wherein the molasses is selected from the group consisting of molasses derived from corn (syrup), molasses derived from sugar beet, molasses derived from sugar cane, and molasses derived from grapes.

13. The process according to claim 11, wherein the molasses is selected from the group consisting of molasses derived from corn (syrup), molasses derived from sugar beet, molasses derived from sugar cane, and molasses derived from grapes.

14. A process for deicing a surface, said process comprising:
(i) the step of spreading the deicing composition according to claim 1 onto said surface; or
(ii) the steps of mixing a solid deicing agent selected from the group consisting of sodium chloride, calcium magnesium acetate, calcium chloride, magnesium chloride, potassium chloride, potassium acetate, sodium acetate, sodium formate, and potassium formate with an aqueous treatment solution comprising a lignin derivative and molasses, and spreading the thus obtained mixture onto said surface, or
(iii) the steps of preparing an aqueous solution comprising between 5% by weight and the saturation concentration of a solid deicing agent selected from the group consisting of sodium chloride, calcium magnesium acetate, calcium chloride, magnesium chloride, potassium chloride, potassium acetate, sodium acetate, sodium formate, and potassium formate, lignin derivative, and molasses, and applying said mixture onto said surface, or
(iv) the steps of spreading a deicing agent selected from the group consisting of sodium chloride, calcium magnesium acetate, calcium chloride, magnesium chloride, potassium chloride, potassium acetate, sodium acetate, sodium formate, and potassium formate in solid or aqueous form onto said surface, and separately spreading a lignin derivative and molasses in solid or aqueous form onto said surface.

15. The process according to claim 14, wherein the deicing agent is sodium chloride.

16. The process according to claim 14, wherein the molasses is selected from the group consisting of molasses derived from corn (syrup), molasses derived from sugar beet, molasses derived from sugar cane, and molasses derived from grapes.

17. The process according to claim 14, wherein the surface is selected from the group consisting of a non-porous asphalt road, an asphalt road, a porous asphalt road, a concrete road, a bituminous road, a brick road, a graveled path, a cobbled road, an unpaved road, and pavement.

18. The process according to claim 14, wherein between 1 and 50 g of the deicing agent, between 0.01 and 500 mg of the lignin derivative, and between 0.01 and 2,500 mg of the molasses is introduced per $m^2$ of said surface.

19. A kit of parts for use in the process according to claim 14, the kit of parts comprising:
an anti-icing composition comprising a deicing agent selected from the group consisting of sodium chloride, calcium magnesium acetate, calcium chloride, magnesium chloride, potassium chloride, potassium acetate, sodium acetate, sodium formate, and potassium formate as a component (a); and
as a component (b) either (i) an aqueous solution comprising between 0% and its saturation concentration of the deicing agent, between 10 ppm and its saturation concentration of lignin derivative, and between 10 ppm and its saturation concentration of molasses; or (ii) a solid component comprising a lignin derivative and molasses.

20. The kit of parts according to claim 19, wherein component (b) is (i), and wherein component (a) forms between 60 and 99.99% by weight of the kit of parts and component (b) forms between 0.01% and 40% by weight of the kit of parts.

21. The kit of parts according to claim 19, wherein component (b) (i) is an aqueous solution comprising between 0% and its saturation concentration of the deicing agent, between 10 ppm and its saturation concentration of lignosulphonate, and between 10 ppm and its saturation concentration of molasses.

22. The kit of parts according to claim 21, wherein component (a) forms between 60 and 99.99% by weight of the kit of parts and component (b) forms between 0.01% and 40% by weight of the kit of parts.

* * * * *